United States Patent
Jaffrey et al.

(10) Patent No.: US 9,970,254 B2
(45) Date of Patent: May 15, 2018

(54) BLOWOUT PREVENTER WITH INFLATABLE ELEMENT

(71) Applicant: Cameron International Corporation, Houston, TX (US)

(72) Inventors: Andrew Jaffrey, Oldmeldrum (GB); Gerrit M. Kroesen, Friendswood, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 13 days.

(21) Appl. No.: 14/840,490

(22) Filed: Aug. 31, 2015

(65) Prior Publication Data
US 2017/0058624 A1  Mar. 2, 2017

(51) Int. Cl.
*E21B 33/06* (2006.01)
*F16J 15/48* (2006.01)
*F16K 7/10* (2006.01)

(52) U.S. Cl.
CPC ............ *E21B 33/062* (2013.01); *E21B 33/06* (2013.01); *F16J 15/48* (2013.01); *F16K 7/10* (2013.01)

(58) Field of Classification Search
CPC ...... E21B 33/062; E21B 33/06; E21B 33/061; E21B 33/127; E21B 33/1277; E21B 33/1243; F16K 7/10; F16J 15/46; F16J 15/48
USPC ....... 251/1.1, 1.2, 1.3, 5; 277/331, 334, 332, 277/605; 138/93; 166/84.1, 84.3, 84.4
See application file for complete search history.

(56) References Cited

U.S. PATENT DOCUMENTS

| | | | | |
|---|---|---|---|---|
| 1,861,726 A * | 6/1932 | Trout | ...................... | E21B 33/06 137/112 |
| 2,038,140 A * | 4/1936 | Stone | ...................... | E21B 33/06 277/332 |
| 2,113,529 A * | 4/1938 | Hild | ...................... | E21B 33/062 175/84 |
| 3,038,732 A * | 6/1962 | Scott | ........................ | F16L 7/02 277/605 |
| 3,737,139 A * | 6/1973 | Watts | ...................... | F16L 17/10 251/1.2 |
| 4,358,085 A * | 11/1982 | Regan | ...................... | F16J 15/46 251/1.2 |
| 4,971,148 A * | 11/1990 | Roche | ...................... | E21B 33/03 166/82.1 |
| 5,209,498 A * | 5/1993 | Colin | ...................... | B61D 19/02 277/646 |
| 5,273,108 A * | 12/1993 | Piper | ...................... | E21B 33/06 166/90.1 |

(Continued)

FOREIGN PATENT DOCUMENTS

WO  2008014514  1/2008

OTHER PUBLICATIONS

International Search Report and Written Opinion of PCT Application No. PCT/US2016/047074 dated Nov. 16, 2016: pp. 1-16.

*Primary Examiner* — Craig J Price
*Assistant Examiner* — Andrew J Rost
(74) *Attorney, Agent, or Firm* — Helene Raybaud (57) ABSTRACT

An apparatus includes a blowout preventer housing comprising a bore extending through the blowout preventer housing and an inflatable element positionable within the blowout preventer housing and comprising an internal cavity. The internal cavity is configured to receive fluid pressure to expand the inflatable element and facilitate forming a seal within the blowout preventer housing.

16 Claims, 6 Drawing Sheets

(56) References Cited

U.S. PATENT DOCUMENTS

| | | | |
|---|---|---|---|
| 8,540,017 B2* | 9/2013 | Ensley | E21B 33/062 166/84.4 |
| 2004/0066003 A1 | 4/2004 | Griffin et al. | |
| 2007/0056749 A1 | 3/2007 | Gambier et al. | |
| 2011/0061854 A1 | 3/2011 | Davies | |

* cited by examiner

BLOWOUT PREVENTER WITH INFLATABLE ELEMENT

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Blowout preventers (BOPs) are used extensively throughout the oil and gas industry. Typical blowout preventers are used as a large specialized valve or similar mechanical device that seal, control, and monitor oil and gas wells. The two categories of blowout preventers that are most prevalent are ram blowout preventers and annular blowout preventers. Blowout preventer stacks frequently utilize both types, typically with at least one annular blowout preventer stacked above several ram blowout preventers. The ram units in ram blowout preventers allow for both the shearing of the drill pipe and the sealing of the blowout preventer. A blowout preventer stack may be secured to a wellhead and may provide a safe means for sealing the well in the event of a system failure.

In a typical ram blowout preventer, a ram bonnet assembly may be bolted to the main body using a number of high tensile bolts or studs. These bolts are required to hold the bonnet in position to enable the sealing arrangements to work effectively. During normal operation, the blowout preventers may be subject to pressures up to 20,000 psi, or even higher. To be able to operate against and to contain fluids at such pressures, blowout preventers are becoming larger and stronger. Blowout preventer stacks, including related devices, 30 feet or more in height are increasingly common. Further, ram-type blowout preventers may require interchangeable parts to be used with pipe having different sizes and strengths. Such requirements, if not impractical, may require the presence of personnel at locations that can be hazardous, and may be limited due to particular size or equipment restrictions.

DESCRIPTION OF THE DRAWINGS

For a detailed description of embodiments of the subject disclosure, reference will now be made to the accompanying drawings in which.

DETAILED DESCRIPTION

The following discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. The embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be an illustration of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but are the same structure or function.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," and variations of these terms is made for convenience, but does not require any particular orientation of the components.

The present disclosure may be used within a blowout preventer, such as an annular blowout preventer and/or a ram blowout preventer. Accordingly, referring now to FIG. 1, a sectional view of a ram blowout preventer 10 in accordance with one or more embodiments of the present disclosure is shown. The blowout preventer 10 includes a housing 12, such as a hollow body, with a bore 14 that enables passage of fluid or a tubular member through the blowout preventer 10. The housing 12 further includes one or more cavities 16, such as cavities 16 opposed from each other with respect to the bore 14, with a ram 18 movably positioned within each cavity 16. The blowout preventer 10 may be coupled to other equipment that facilitates natural resource production. For instance, production equipment or other components may be attached to the top of the blowout preventer 10 using a connection 20 (which may be facilitated in the form of fasteners), and the blowout preventer 10 may be attached to a wellhead or spool using the flange 22 and additional fasteners.

Figure 1:
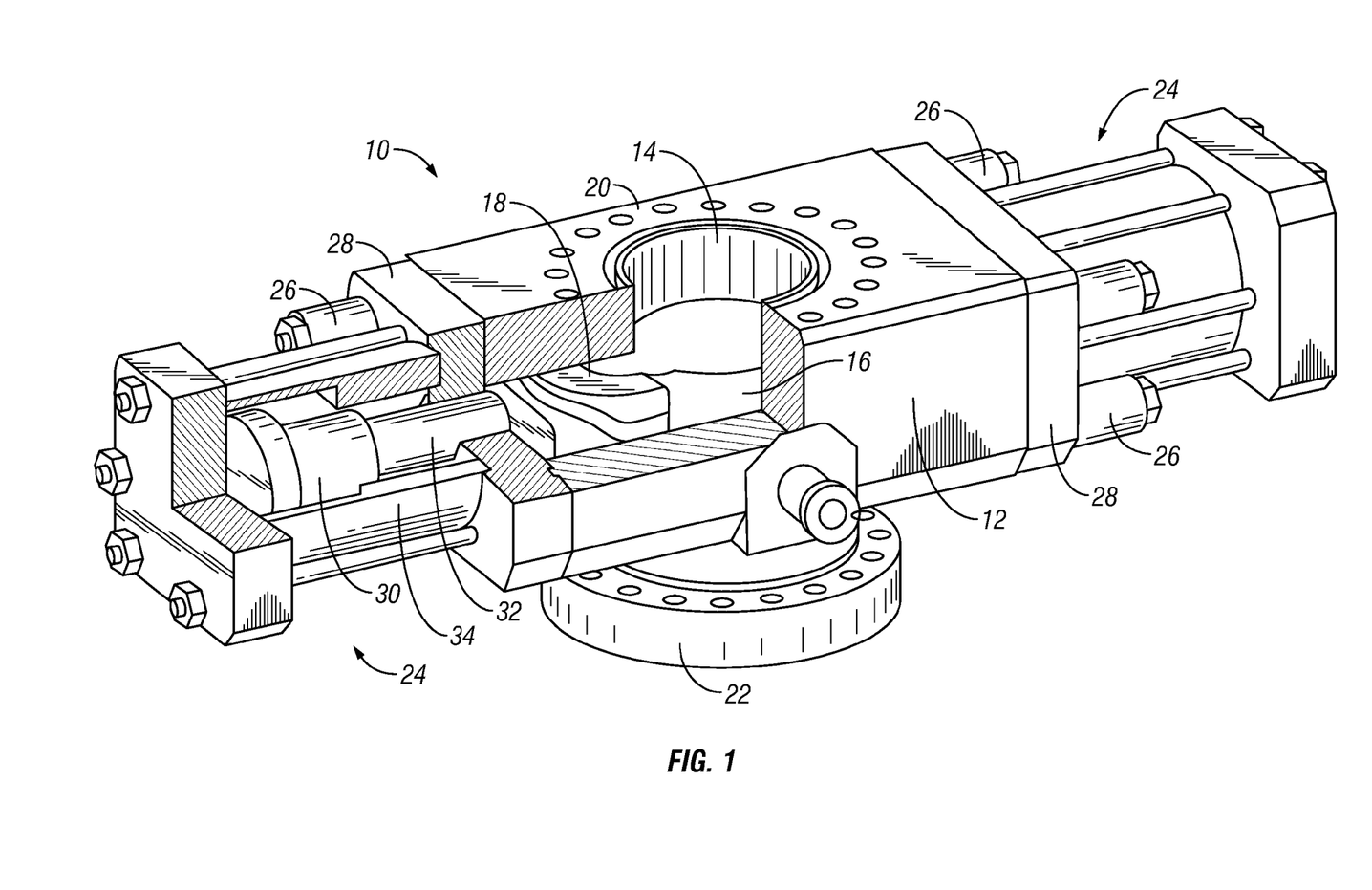
FIG. 1 shows a sectional view of a ram blowout preventer in accordance with one or more embodiments of the present disclosure.

One or more bonnet assemblies 24 are secured to the housing 12 and include various components that facilitate control of the rams 18 positioned in the blowout preventer 10. The bonnet assemblies 24 are coupled to the housing 12 by using one or more fasteners 26 to secure the bonnets 28 of the bonnet assemblies 24 to the housing 12. The rams 18 are then actuated and moved through the cavities 16, into and out of the bore 14, by operating and moving a piston 30 and a rod 32 coupled thereto within a housing 34 of the bonnet assemblies 24. In operation, a force (e.g., from hydraulic pressure) may be applied to the pistons 30 to drive the rods 32, which in turn drives the rams 18 coupled thereto into the bore 14 of the blowout preventer 10. The rams 18 cooperate with one another when driven together to seal the bore 14 and inhibit flow through the blowout preventer 10. For example, the rams 18 may be pipe rams, as shown, such that the pipe rams seal about a pipe or tubular member present within the bore 14 of the blowout preventer housing 12. The rams 18 may also be blind rams such that the blind rams seal against one another when nothing is present within the bore 14 of the blowout preventer housing 12. Further, the rams 18 may be shear rams such that, when driven towards each other, shear a tubular member present within the bore 14 of the housing 12 of the blowout preventer 10.

Figure 2:
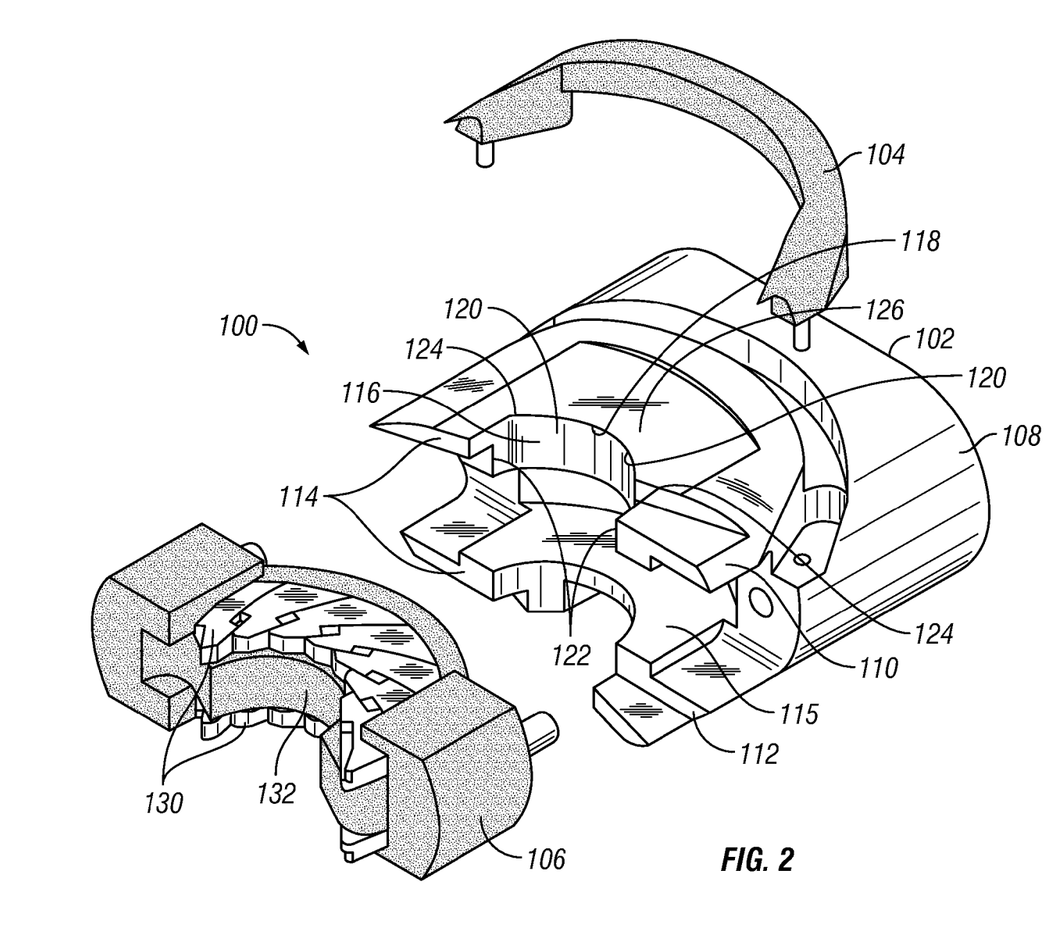
FIG. 2 shows an exploded view of a variable bore ram packer assembly in accordance with one or more embodiments of the present disclosure.

Furthermore, in yet another embodiment, the rams 18, which may be pipe rams, may be variable bore rams. For example, FIG. 2 shows an exploded view of a variable bore ram packer assembly 100 in accordance with one or more embodiments of the present disclosure. The variable bore ram packer assembly 100 includes a ram body 102, a top seal 104, and a variable bore packer 106. The variable bore packer 106 may include one or more inserts 130 positioned within an elastomeric element or body 132, in which the inserts 130 provide support to the elastomeric body 132 during sealing engagement (e.g., against a tubular member). In particular, the inserts 130 may provide support to the elastomeric body 132 during sealing engagement when the variable bore packer 106 is sealing against tubular members of different sizes. Further, the top seal 104 may include an elastomeric element or body that may provide sealing engagement between the ram body 102 and the cavity 16 of the blowout preventer housing 12.

The ram body 102 is a generally rectangular parallelepiped shape with rounded sides 108 that fit in the cavities 16 of the blowout preventer housing 12. The ram body 102 includes an upper body 110 and a lower body 112 connected by a front face 114 and to define a ram packer cavity 115 therebetween. A ram bore profile 116 is formed within the front face 114, in which the ram bore profile 116 may be substantially U-shaped and extend vertically through the upper body 110 to the ram packer cavity 115. The ram bore profile 116 may further be characterized by a rear portion 118, diverging sides 120, and a front throat 122. The rear portion 118 is shown as an arcuate segment connected to the front throat 122 by the diverging sides 120. The front throat 122 intersects the front face 114 at a substantially perpendicular angle, and the arcuate sections 124 connect to the diverging sides 120. The area 126 adjacent the ram bore profile 116 may be hardened by suitable means as weld inlay or thermal treatment to increase the load carrying capacity of ram bore profile 116.

Figure 3:
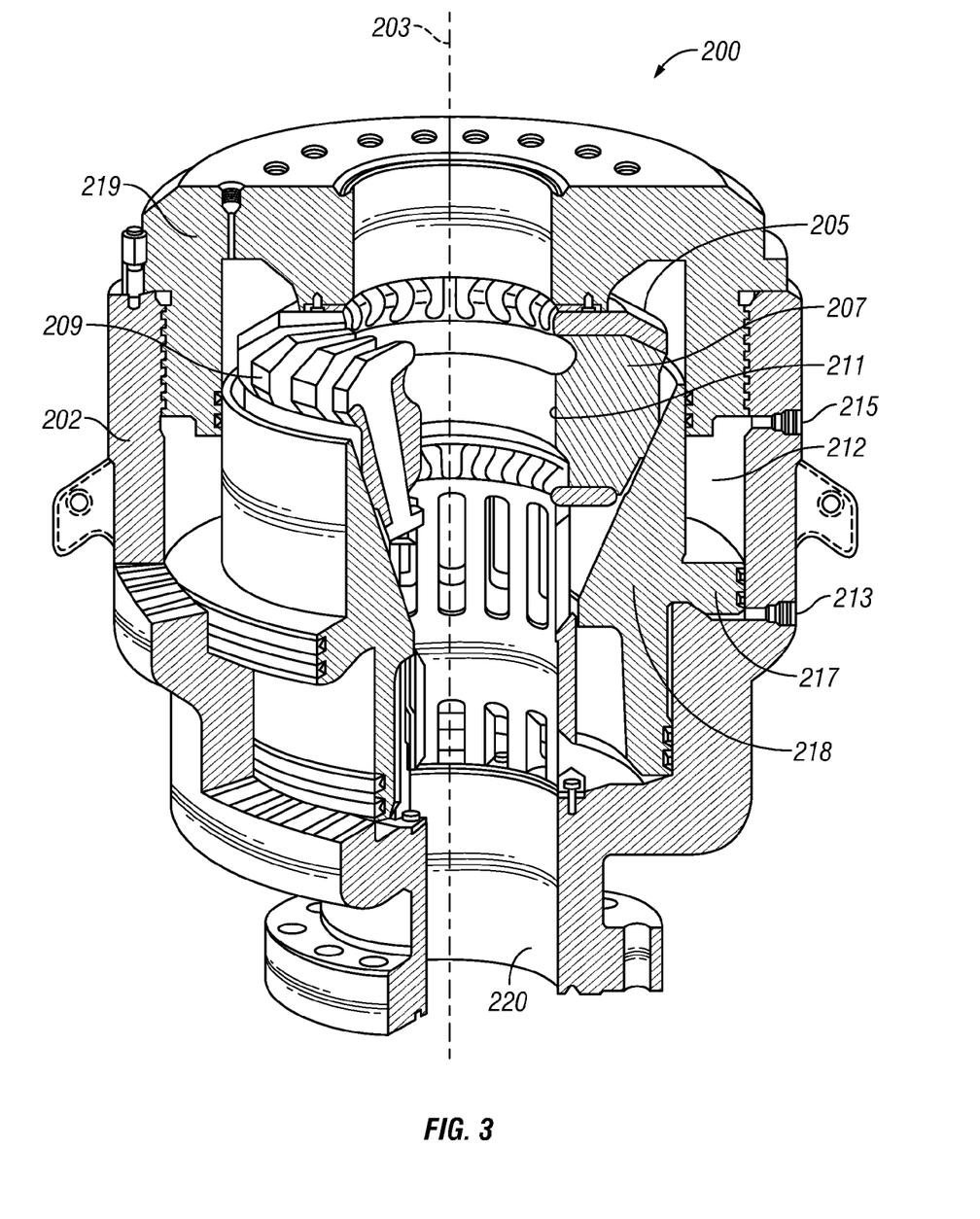
FIG. 3 shows a sectional view of an annular blowout preventer in accordance with one or more embodiments of the present disclosure.

Referring now to FIG. 3, a sectional view of an annular blowout preventer 200 in accordance with one or more embodiments of the present disclosure is shown. The annular blowout preventer 200 includes a housing 202 with a bore 220 extending therethrough that is disposed about a longitudinal axis 203. A packing unit 205 is disposed within the annular blowout preventer 200 about the longitudinal axis 203. The packing unit 205 includes an elastomeric annular body 207 and a plurality of metallic inserts 209. The metallic inserts 209 are disposed within the elastomeric annular body 207 of the packing unit 205 and may be distributed at equal radial distances from one another about the longitudinal axis 203. The packing unit 205 includes a bore 211 concentric with the bore 220 of the blowout preventer 200.

The annular blowout preventer 200 is actuated by fluid pumped into an opening 213 of a piston chamber 212. The fluid applies pressure to a piston 217, which moves the piston 217 upward. As the piston 217 moves upward, the piston 217 translates force to the packing unit 205 through a wedge face 218. The force translated to the packing unit 205 from the wedge face 218 is directed upward toward a removable head 219 of the annular blowout preventer 200, and inward toward the longitudinal axis 203 of the annular blowout preventer 200. Because the packing unit 205 is retained against the removable head 219 of the annular blowout preventer 200, the packing unit 205 does not displace upward from the force translated to the packing unit 205 from the piston 217. However, the packing unit 205 does displace inward from the translated force, which compresses the packing unit 205 toward the longitudinal axis 203 of the annular blowout preventer 200. In the event a drill pipe is located along the longitudinal axis 203, with sufficient radial compression, the packing unit 205 will seal about the drill pipe into a "closed position." In the event a drill pipe is not present, the packing unit 205, with sufficient radial compression, will completely seal the bore 211.

The annular blowout preventer 200 may optionally go through an analogous reverse movement when fluid is pumped into opening 215 of the piston chamber 212, instead of opening 213. The fluid translates downward force to the piston 217, such that the wedge face 218 of the piston 217 allows the packing unit 205 to radially expand to an "open position." Further, the removable head 219 of the annular blowout preventer 200 enables access to the packing unit 205, such that the packing unit 205 may be serviced or changed if necessary. Alternatively, the packing unit 205 may radially expand to the open position from the elastomeric body 207 biasing and pushing against the piston 217 when the piston 217 no longer applies a pressure to the packing unit 205, thereby enabling the packing unit 205 to expand and relax.

In accordance with one or more embodiments, the present disclosure relates to an inflatable element for use within a blowout preventer, in which the inflatable element is inflatable to facilitate forming a seal within the blowout preventer. For example, the inflatable element may receive fluid pressure (e.g., liquid or gas under pressure) within a cavity formed within the inflatable element, in which the inflatable element may then inflate or be pressurized to form a seal with the inflatable element, or form a seal with a component operably coupled to the inflatable element.

Figure 4:
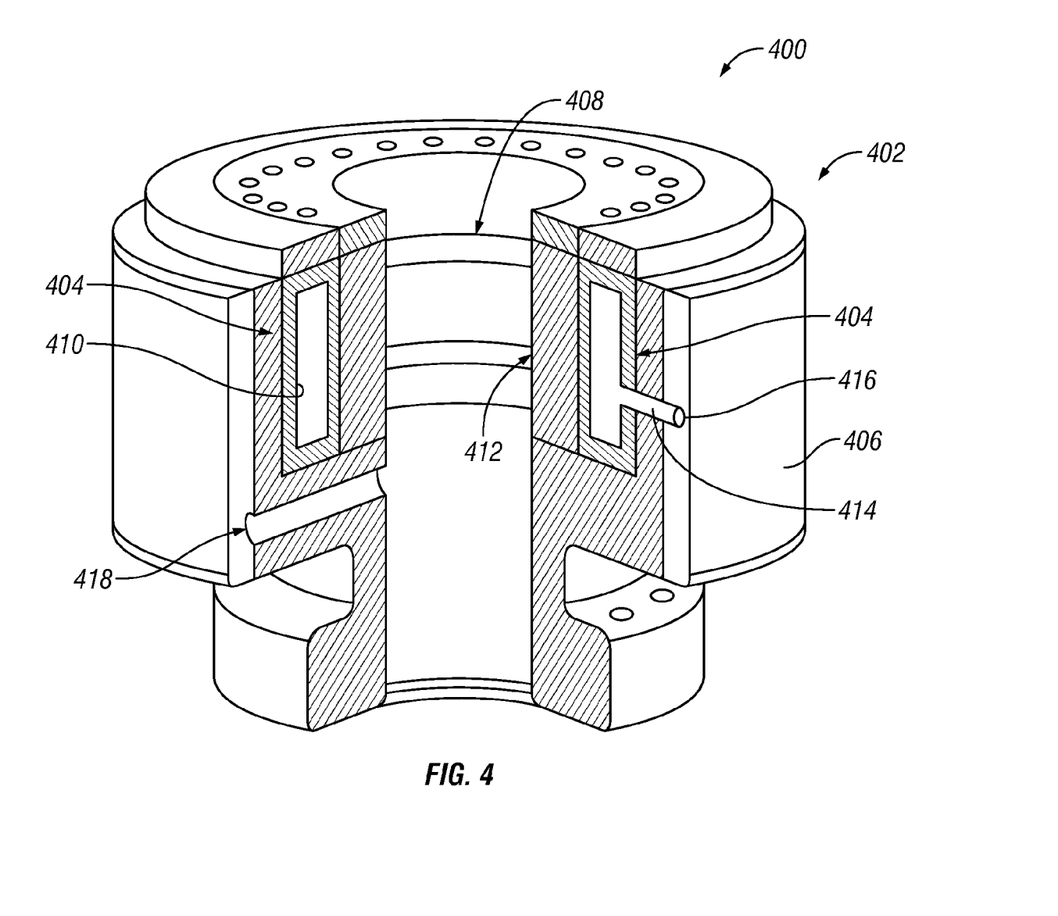
FIG. 4 shows a sectional view of a system or apparatus including a blowout preventer and an inflatable element in accordance with one or more embodiments of the present disclosure.

Accordingly, referring now to FIG. 4, a sectional view of a system or apparatus 400 including a blowout preventer 402 and an inflatable element 404 in accordance with one or more embodiments of the present disclosure is shown. The blowout preventer 402 is shown as an annular blowout preventer in this embodiment, but the present disclosure is not so limited, as the present disclosure may also be used with a ram blowout preventer (e.g., blind, pipe, shear, and/or variable bore ram blowout preventer). The blowout preventer 402 includes a housing 406 that has a bore 408 formed about an axis that extends through the housing 406. The inflatable element 404, which may be an inflatable packer, is then positioned within the housing 406 of the blowout preventer 402. The inflatable element 404 has a cavity 410 formed therein and is able to receive fluid pressure within the cavity 410 of the inflatable element 404.

As fluid pressure is received within the cavity 410 of the inflatable element 404, the inflatable element 404 may then inflate or become pressurized to form a seal within the housing 406 of the blowout preventer 402. In particular, the inflatable element 404 may inflate or become pressurized such that the inflatable element 404 forms a seal itself within the housing 406 of the blowout preventer 402, and/or a component (e.g., packer, sealing element) operably coupled or connected to the inflatable element 404 forms a seal within the housing 406 of the blowout preventer 402 as the inflatable element 404 inflates or becomes pressurized.

For example, in FIG. 4, as the blowout preventer 402 is shown as an annular blowout preventer, the inflatable element 404 may be formed as an annular body such that the body is positioned about the axis of the blowout preventer housing 406. In this embodiment, a packer 412, which may be formed from an elastomeric material, is operably coupled to the inflatable element 404. In particular, the packer 412 may be formed as an annular body that is positioned radially within the interior of the annular body of the inflatable element 404. As the inflatable element 404 inflates or becomes pressurized with fluid pressure into the cavity 410, the inflatable element 404 then pushes the packer 412 to form a seal within the housing 406 of the blowout preventer 402. The packer 412 may form a seal about a tubular member positioned within the bore 408 of the blowout preventer housing 406. Alternatively, the packer 412 may form a seal about itself if no tubular member or object is positioned within the bore 408 of the blowout preventer housing 406. Further, in this embodiment, as the packer 412 may be subject to wear due to sealing within the blowout preventer housing 406, the packer 412 may be replaced (e.g., by removing the head of the blowout preventer housing 406) without also having to replace the inflatable element 404.

Figure 5:
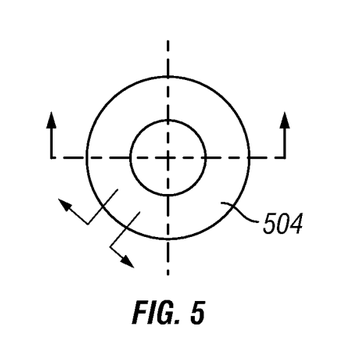
FIG. 5 shows an above view of an inflatable element in accordance with one or more embodiments of the present disclosure.
Figure 6:
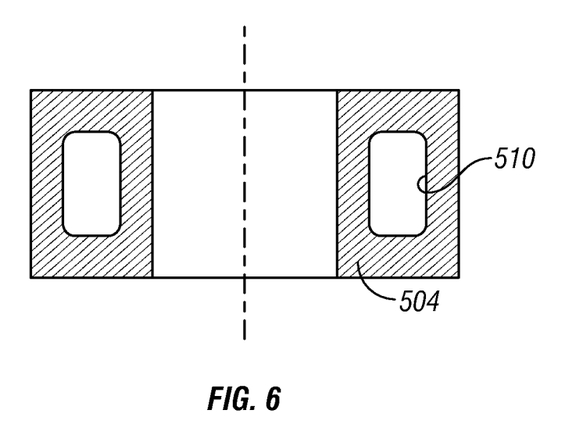
FIG. 6 shows a cross-sectional view of an inflatable element in accordance with one or more embodiments of the present disclosure.
Figure 7:
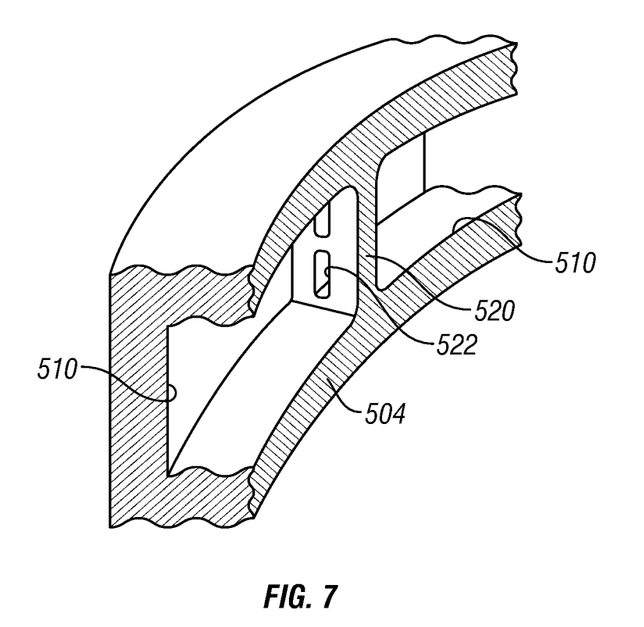
FIG. 7 shows a sectional view of the inflatable element in accordance with one or more embodiments of the present disclosure.

In another embodiment, the inflatable element may inflate or become pressurized such that the inflatable element then forms a seal within the housing of the blowout preventer. For example, as shown in FIGS. 5-7, multiple views of an inflatable element 504 in accordance with one or more embodiments of the present disclosure are shown. In particular, FIG. 5 shows a top view of the inflatable element 504, FIG. 6 shows a cross-sectional view of the inflatable element 504, and FIG. 7 shows a sectional view of the inflatable element 504.

As shown, the inflatable element 504 may be formed as an annular body, in which the inflatable element 504 may be used to replace the inflatable element 404 and the packer 412 in FIG. 4. As the inflatable element 504 inflates or becomes pressurized with fluid pressure into the cavity 510, the inflatable element 504 then may inflate to form a seal within the housing 406 of the blowout preventer 402. For example, the inflatable element 504 may form a seal about a tubular member positioned within the bore 408 of the blowout preventer housing 406, or the inflatable element 504 may form a seal about itself if no tubular member or object is positioned within the bore 408 of the blowout preventer housing 406.

Referring back to FIG. 4, the inflatable element 404 may include one or more fluid conduits 414 for fluid pressure to flow through into and out of the cavity 410 of the inflatable element 404. The fluid conduit 414 may be formed within a wall of the inflatable element 404 and extend between the cavity 410 and the exterior of the inflatable element 404.

A fluid port 416 may be included with the blowout preventer 402 to introduce fluid pressure to the cavity 410 of the inflatable element 404. The fluid port 416, for example, as shown in FIG. 4 may be formed within a wall of the blowout preventer housing 406 and be in fluid communication with the fluid conduit 414, in which fluid pressure introduced to the fluid port 416 is then communicated to the cavity 410 of the inflatable element 404. For example, a tube, hose, or other type of conduit may extend between the fluid port 416 and the fluid conduit 414 such that fluid pressure introduced into the fluid port 416 may flow into the fluid conduit 414.

As mentioned above, fluid pressure may be provided from a fluid pressure source (e.g., located on the surface if the blowout preventer is on the surface or subsea if the blowout preventer is subsea) by a liquid and/or a gas under pressure to the inflatable element 404. Accordingly, in one or more embodiments, the fluid pressure may be provided by a hydraulic fluid. Further, in one or more embodiments, a relief port 418 may be included with the blowout preventer 402 to relieve fluid pressure from the interior of the blowout preventer housing 406. The relief port 418, for example, as shown in FIG. 4 may be formed within a wall of the blowout preventer housing 406 such that fluid pressure (e.g., gas pressure) that accumulates within the bore 408 of the housing 406 may be relieved through the relief port 418.

Referring now back to FIG. 5-7, the inflatable element 504 may include one or more supportive elements that reinforce and the support the inflatable element 504. In one embodiment, and as shown particularly in FIG. 7, the inflatable element 504 may include one or more bulkheads 520 formed or positioned therein. The bulkheads 520 define multiple cavities 510 within the inflatable element 504 and provide support to the inflatable element 504. Further, in an embodiment in which multiple cavities 510 are formed or defined within the inflatable element 504, the cavities 510 may be in fluid communication with each other so as to distribute the fluid pressure across the cavities 510. For example, the bulkhead 520 includes one or more pressure ports 522 such that fluid pressure may flow through the pressure ports 522 and between the cavities 510. Alternatively, FIGS. 8-10 also show different arrangements for the pressure ports 522 that enable fluid flow between the cavities 510 of the inflatable element 504.

Figure 10:
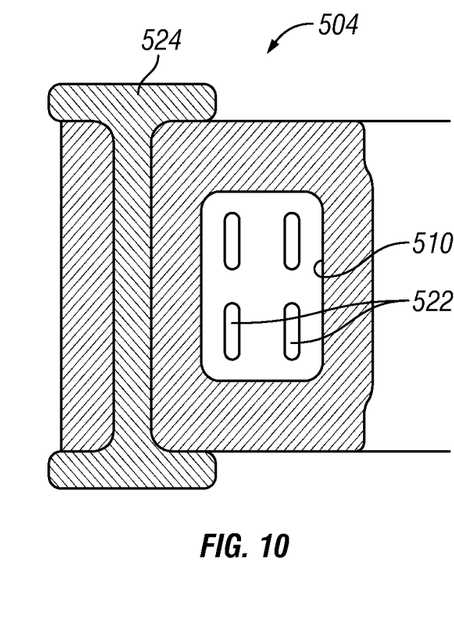
FIG. 10 shows a cross-section of an inflatable element in accordance with one or more embodiments of the present disclosure.

As shown in FIG. 10, in addition or in alternative to the bulkhead 520, the inflatable element 504 may include one or more other reinforcement members or materials, such as having one or more inserts 524 positioned within the body of the inflatable element 504. For example, in an embodiment in which the inflatable element 504 is used within an annular blowout preventer 200, the inserts 524 may be positioned within the inflatable element 504 similar to the inserts 209 in FIG. 3. In an embodiment in which the inflatable element 504 is used within a variable bore ram, the inserts 524 may be positioned within the inflatable element 504 similar to the inserts 130 in FIG. 2. In yet another embodiment, the inflatable element may include an interlaced or fiber material, mesh, and/or wire banding included therein to provide structure to the inflatable element.

Figure 8:
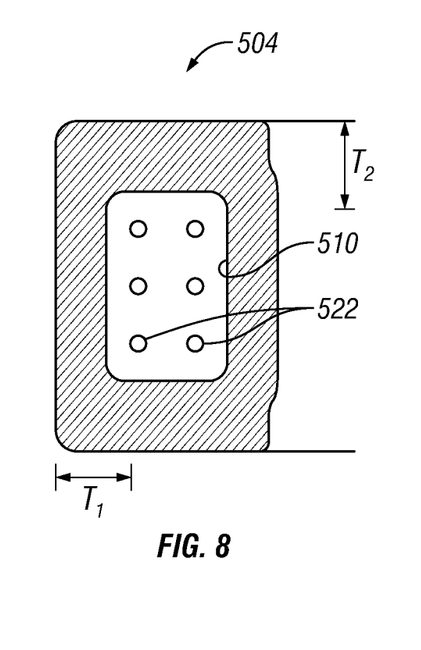
FIG. 8 shows a cross-section of an inflatable element in accordance with one or more embodiments of the present disclosure.

In one or more embodiments, an inflatable element in accordance with the present disclosure may have a design or construction to have the inflatable element inflate or deform in a controlled or designed fashion. By having the inflatable element include additional supports in predetermined areas, the inflatable element may then be able to inflate or deform in a predetermined way or with predetermined loading. In one embodiment, this may relate to adjusting the ratio or thickness of the material of the inflatable element in the vertical and horizontal direction to preferentially deform the inflatable element in one direction versus another direction. For example, as shown in FIG. 8, the thickness of the material $T_1$ extending in the horizontal direction (e.g., material positioned at top or bottom of inflatable element 504) may be smaller or thinner than the thickness of the material $T_2$ extending in the vertical direction (e.g., material positioned at interior or exterior of inflatable element 504). In such an embodiment, this may result in a decrease in deformation for the areas where the inflatable element 504 has areas with thicker material (e.g., minimize deformation for the area with the material having the larger thickness $T_2$), increase deformation towards the centerline of the inflatable element 504, and vice-versa.

Figure 9:
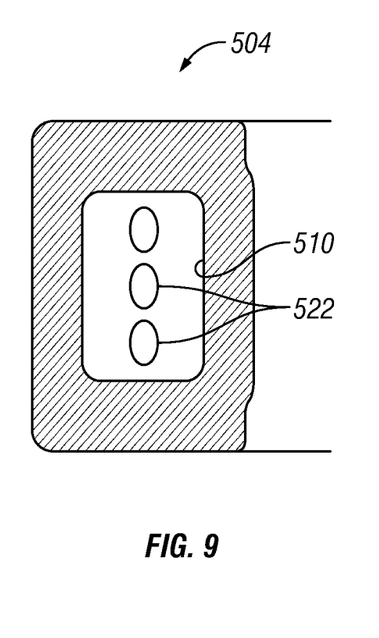
FIG. 9 shows a cross-section of an inflatable element in accordance with one or more embodiments of the present disclosure.

Further, as discussed with reference to FIGS. 8-10, the inflatable element 504 include one or more bulkheads 520 formed or positioned therein that define multiple cavities 510 with one or more pressure ports 522 such that fluid pressure may flow through the pressure ports 522 and between the cavities 510. The pressure ports 522 may be formed or designed to have the inflatable element inflate or deform in a controlled or designed fashion, such as by adjusting the size or shape of the pressure ports 522 in the vertical and horizontal direction to preferentially deform the inflatable element in one direction versus another direction. For example, in FIGS. 8-10, the shape and size of the pressure ports 522 generally all leave more material remaining in the bulkhead 520 in the vertical direction than in the horizontal direction. This may result in a higher degree of constraint or resistance to expansion/inflation in the vertical direction than in the horizontal direction, thus controlling the inflatable element 504 to deform more horizontally, and vice-versa. Accordingly, in one or more embodiments, an inflatable element in accordance with the present disclosure may have a design or construction to have the inflatable element inflate or deform in a controlled or designed fashion.

As discussed above, an inflatable element in accordance with the present disclosure may be used in any type of blowout preventer. For example, FIG. 4 shows the inflatable element 404 used within an annular blowout preventer 402. In another embodiment, an inflatable element in accordance with the present disclosure may be used within a ram blowout preventer. For example, with reference to FIGS. 1 and 2, the rams 18 may include an inflatable element that has a cavity to receive fluid and facilitate forming a seal within the blowout preventer housing 12. In particular, the inflatable element may be used to replace the elastomeric element or body 132 of the variable bore packer 106 such that the variable bore packer 106 includes a cavity to receive fluid pressure to facilitate forming a seal within the blowout preventer.

Additionally or alternatively, the inflatable element may be used to replace the top seal 104 such that the top seal 104 includes a cavity to receive fluid pressure to facilitate forming a seal within the blowout preventer. In an embodiment in which the inflatable element is used within a ram blowout preventer, a conduit or hose may be used within the blowout preventer housing to provide fluid pressure to the inflatable element, such as the inflatable element moves within the blowout preventer housing. Further, in an embodiment in which the inflatable element is used within a blowout preventer, the blowout preventer may first be activated (e.g., to seal about or shear a tubular member), and then the inflatable element may be inflated with pressurized fluid to facilitate forming a seal within the blowout preventer housing.

In one or more embodiments, a sensor may be used to indicate a condition of the inflatable element. For example, a sensor, such as an ultrasonic sensor, may be embedded within the body or the wall of the inflatable element. The sensor may then generate or provide a signal that may relate to the condition of the inflatable element. In particular, the sensor may be positioned upon a portion of the inflatable element that is expected to experience greater wear, in which the sensor may then indicate if the inflatable element needs to be replaced.

Further, in one or more embodiments, a sensor may be used to detect if an object is present within a bore of a blowout preventer, and/or the sensor may be used to measure a size of the object present within the bore of the blowout preventer. The sensor may be operably coupled to a blowout preventer housing (e.g., positioned above, below, adjacent, and/or within the bore of the blowout preventer housing), in which the sensor may then generate a signal based upon the presence or size of an object within the bore of the blowout preventer housing. The inflatable element may then receive or release fluid pressure from the cavity based upon the signal from the sensor. For example, if the sensor detects an object within the bore of the blowout preventer housing, the sensor may provide a signal based upon this measurement, and fluid pressure may then be selectively provided to the cavity of the inflatable element. This may involve increasing the fluid pressure to the cavity of the inflatable element, such as if needed to seal upon an object or tubular member smaller than normal or expected, or decreasing the fluid pressure to the cavity of the inflatable element, such as if needed to seal upon an object or tubular member larger than normal or expected.

An inflatable element in accordance with the present disclosure may be formed or constructed from one or more materials. For example, an inflatable element may include an elastomeric material, a composite material, and/or a fiber material (e.g., Kevlar). Further, the inflatable element may be constructed using different techniques, such as by additive layer manufacturing and/or casting (e.g., wax casting). Accordingly, different materials and/or techniques may be used for the construction of an inflatable element without departing from the scope of the present disclosure.

Although the present invention has been described with respect to specific details, it is not intended that such details should be regarded as limitations on the scope of the invention, except to the extent that they are included in the accompanying claims.

What is claimed is:

1. A method to seal within a blowout preventer, comprising:

providing fluid pressure into a plurality of cavities of an inflatable element positioned within a blowout preventer housing, the inflatable element comprising a plurality of bulkheads azimuthally positioned in the inflatable element about an axis of the blowout preventer with a plurality of pressure ports formed within at least one of the plurality of bulkheads and arranged longitudinally with respect to the axis of the blowout preventer; and forming a seal within the blowout preventer housing in response to the fluid pressure provided to the plurality of cavities.

2. The method of claim 1, wherein the forming the seal comprises forming the seal with the inflatable element at least partially about a tubular member positioned within a bore of the blowout preventer housing.

3. The method of claim 1, further comprising moving a ram within a cavity of the blowout preventer housing before forming the seal within the blowout preventer housing.

4. The method of claim 1, further comprising:
detecting a presence of an object within a bore of the blowout preventer housing; and
providing fluid pressure into the cavity of the inflatable element if an object is detected within the bore of the blowout preventer housing.

5. An apparatus comprising:
a blowout preventer housing comprising a bore extending through the blowout preventer housing; and
an inflatable element positionable within the blowout preventer housing and comprising a plurality of bulkheads azimuthally positioned in the inflatable element about an axis of the bore to define a plurality of internal cavities, the plurality of internal cavities in fluid communication with each other and configured to receive fluid pressure through a plurality of pressure ports formed within at least one of the plurality of bulkheads and arranged longitudinally with respect to the axis of the bore to expand the inflatable element and facilitate forming a seal within the blowout preventer housing.

6. The apparatus of claim 5, wherein:
the blowout preventer housing comprises a housing cavity intersecting the bore;
the apparatus further comprises a ram movably positionable within the housing cavity and at least partially movable into the bore of the blowout preventer housing; and
the inflatable element is positioned upon the ram to be movable with the ram within the housing cavity.

7. The apparatus of claim 6, wherein:
the ram comprises a pipe ram;
the inflatable element is positioned upon an end of the pipe ram and at least partially movable into the bore of the blowout preventer housing; and
the inflatable element is configured to form the seal at least partially about a tubular member when the tubular member positioned within the bore of the blowout preventer housing.

8. The apparatus of claim 7, wherein the pipe ram comprises a variable bore ram.

9. The apparatus of claim 5, wherein:
the blowout prevent housing comprises an annular blowout preventer housing; and
the inflatable element comprises an annular body configured to form the seal at least partially about a tubular member when the tubular member positioned within the bore of the blowout preventer housing.

10. The apparatus of claim 9, wherein the annular body comprises a plurality of rigid inserts positioned within the annular body.

11. The apparatus of claim 5, wherein the inflatable element is configured to form the seal within the blowout preventer housing.

12. The apparatus of claim 5, further comprising a packer operably coupled to the inflatable element, and the packer configured to form the seal within the blowout preventer housing.

13. The apparatus of claim 5, wherein the inflatable element further comprises a fluid conduit in fluid communication with at least one of the internal cavities and configured to receive fluid pressure.

14. The apparatus of claim 5, wherein the inflatable element further comprises at least one of an elastomeric material, a composite material, and a fiber material.

15. The apparatus of claim 5, wherein a thickness of an inner wall or an outer wall of the inflatable element is different than a thickness of an upper wall or a lower wall of the inflatable element.

16. An annular blowout preventer, comprising:
an annular blowout preventer housing comprising a bore extending through the annular blowout preventer housing; and
an inflatable element comprising an annular body and a plurality of bulkheads azimuthally positioned in the inflatable element about an axis of the bore to define a plurality of internal cavities within the annular body, the inflatable element positionable within the annular blowout preventer housing, the plurality of internal cavities in fluid communication with each other and configured to receive fluid pressure through a plurality of pressure ports formed within at least one of the plurality of bulkheads and arranged longitudinally with respect to the axis of the bore to expand the inflatable element and facilitate forming a seal within the annular blowout preventer housing.

* * * * *